US007486668B2

(12) United States Patent
Reichbauer (10) Patent No.: US 7,486,668 B2
(45) Date of Patent: Feb. 3, 2009

(54) COMMUNICATING AN IDENTIFICATION PARAMETER OF A NETWORK NODE

(75) Inventor: Hermann Reichbauer, Munich (DE)

(73) Assignee: Seimens Aktiengesellschaft, Munich (DE)

( * ) Notice: Subject to any disclaimer, the term of this patent is extended or adjusted under 35 U.S.C. 154(b) by 1120 days.

(21) Appl. No.: 10/225,210

(22) Filed: Aug. 20, 2002

(65) Prior Publication Data

US 2003/0103531 A1    Jun. 5, 2003

(30) Foreign Application Priority Data

Dec. 3, 2001  (DE)  ............................. 101 59 261

(51) Int. Cl.
*H04L 12/50*  (2006.01)
(52) U.S. Cl. .................. 370/385; 370/410; 370/352; 370/466; 379/220.01
(58) Field of Classification Search ................ 370/284, 370/255, 385, 231, 227, 225, 221, 220, 219, 370/218, 217, 400, 254, 216, 522, 465, 410, 370/230, 228, 352, 356, 466; 379/231–233, 379/221.01–221.15, 220.01, 229, 230
See application file for complete search history.

(56) References Cited

U.S. PATENT DOCUMENTS

| 5,377,262 | A |   | 12/1994 | Bales et al. ............. 379/221.06 |
| 5,499,290 | A | * | 3/1996  | Koster ...................... 370/426 |
| 5,592,477 | A | * | 1/1997  | Farris et al. ............... 370/396 |
| 5,732,130 | A | * | 3/1998  | Iapalucci et al. ........ 379/221.12 |
| 6,137,876 | A |   | 10/2000 | Wong et al. ................ 379/246 |
| 6,327,358 | B1 | * | 12/2001 | March et al. ........... 379/221.01 |
| 6,658,022 | B1 | * | 12/2003 | West et al. ................ 370/467 |
| 6,728,205 | B1 | * | 4/2004  | Finn et al. ................. 370/400 |

FOREIGN PATENT DOCUMENTS

| EP | 0556515 A2  | 12/1991 |
| WO | WO 99/29090 | 12/1997 |

* cited by examiner

*Primary Examiner*—Ian N Moore
(74) *Attorney, Agent, or Firm*—Imperium Patent Works; Darien K. Wallace; T. Lester Wallace (57) ABSTRACT

A reference network node in a circuit-switched network obtains information about a partner network node by including a requesting element in a connection SETUP message sent to the partner network node. The partner network node responds with identification parameters included in response messages (for example, a CONNECT message). The reference network node uses the received identification parameters to send appropriate configuration information (for example, connection control of transmission links) to the partner network node.

12 Claims, 5 Drawing Sheets

FIG. 5

COMMUNICATING AN IDENTIFICATION PARAMETER OF A NETWORK NODE

CROSS REFERENCE TO RELATED APPLICATION

This application is based on and hereby claims priority to German Application No. 101 59 261.2 filed on Dec. 3, 2001, in Germany, the contents of which are incorporated herein by reference.

TECHNICAL FIELD

The present invention relates to setting up network connections between nodes of a data transmission network. More specifically, the invention relates to sending identification information within a signaling message.

BACKGROUND

Both digital data and analog data is transmitted through data transmission networks, such as circuit-switched telephone networks and packet data transmission networks, for example the Internet. In upper protocol layers, data transmission is accomplished by establishing connections between nodes of the data transmission network. There is a connection setup phase, a data transmission phase and a connection release phase. There can be an actual physical connection or a connection defined by identification parameters representing specific network nodes. A "node access code" (NAC) is an example of an identification parameter.

A connection that is made by assigning identification parameters of network nodes is also called a logical connection or a virtual connection. Where a virtual connection has been established, data can be transmitted at lower protocol layers without requiring a connection setup phase and a connection release phase in these protocol layers.

A network node is an element of the data transmission network that provides switching functions. Three transmission links are generally connected to each network node. Depending on the connection signaling, data arriving on a transmission link is forwarded to a different transmission link defined by the signaling. Examples of network nodes in circuit-switched data transmission networks are switching centers, private branch exchanges and network nodes. A router is an example of a network node in a packet data transmission networks.

Between switching centers in a circuit-switched data transmission network, signaling can be used that conforms to the ISUP (ISDN User Part) signaling protocol. Between the private branch exchanges of a private branch exchange interconnection, signaling can be used that conforms to the QSIG protocol (Q-interface signaling protocol) or a protocol based on QSIG protocol, such as the Cornet NQ protocol of SIEMENS AG. In the Internet, the signaling protocol TCP (Transmission Control Protocol) is used between the terminals.

In the Internet, communicating identification parameters is accomplished by using either broadcast update messages or flooding. In circuit-switched data transmission networks, however, there is no known method for automatically communicating identification parameters that can be used in the connection setup process to identify network nodes. A method is therefore sought for sending identification parameters between nodes of a circuit-switched data transmission network. An apparatus is desired that communicates identification parameters within a circuit-switched data transmission network.

SUMMARY

A reference network node in a circuit-switched network obtains information about a partner network node by including a requesting element in a connection SETUP message sent to the partner network node. The partner network node responds with identification parameters included in response messages (for example, a CONNECT message). The reference network node uses the received identification parameters to send appropriate configuration information (for example, connection control of transmission links) to the partner network node.

A transmission link lies between a reference network node and a partner network node of a data transmission network. A first signaling message is transmitted through the transmission link from the reference network node to the partner network node. The first signaling message controls the connection for the transmission of data between two terminals of the data transmission network. The data can be transmitted through the same transmission link through which the signaling message is transmitted, or through a different transmission link. A response signaling message is transmitted from the partner network node to the reference network node. The response signaling message can likewise control the connection for the transmission of data between two terminals.

A message element requesting the transmission of an identification parameter is automatically inserted into the first signaling message. The identification parameter is then transmitted in the response signaling message from the partner network node to the reference network node.

In one embodiment, the identification parameter is an internal line number that can be used to make an additional request of the partner network node. The internal line number is used to request additional identification parameters of the partner network node. The additional identification parameters further identify the partner network node or a constituent part of the partner network node. The partner network node then transmits the additional identification parameters back to the reference network node. This allows the additional identification parameters to be requested independently of the signaling in the first signaling message, which is used to establish the connection for data transmission. Furthermore, the time at which the connection signaling and the request for the additional identification parameters are sent can be separated from the time at which the additional identification parameters are sent.

In another embodiment, the identification parameter and an additional identification parameter are used to acquire information on the topology of the data transmission network. The network topology describes the spatial structure of the data transmission network. The network topology specifies which network node is directly connected to which other network node. The identification parameters can be used for routing, i.e., for identifying transmission links to a specified destination. The identification parameters are stored in the reference network node and are used to evaluate and collect parameters and data.

In another embodiment, a method for communicating identification parameters is executed in a plurality of network nodes. The appropriate network node takes on the role of the reference network node. The topology of the data transmission network can easily be determined when each network node executes the method and is then requested to transmit the identification parameter or additional identification parameters that it collected locally.

Another embodiment relates to an apparatus that obtains information about a neighboring network node by including a requesting element in a connection SETUP message sent to the partner network node. Embodiments also relate to a program containing an instruction sequence that, when executed, obtains information about a neighboring node. The technical effect of earlier embodiments thus likewise applies to the apparatus and to the program.

In yet another embodiment, the data transmission network is a circuit-switched data transmission network in which transmission links and transmission channels of a time division multiplexer method are connected depending on the signaling data, for example, in a switching network. In one refinement, the transmission link is preferably an electrically conductive line or an optical waveguide. However, radio transmission links can also be utilized as the transmission link.

For circuit-switched data transmission networks, as well as for private branch exchange interconnections, there is no known method for automatically communicating identification parameters that are then used to acquire the topology of the circuit-switched network or the private branch exchange. According to embodiments of the invention, the topology of a circuit-switched data transmission network and of a private branch exchange can be automatically acquired. It is no longer necessary to acquire the topology manually.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

There are various embodiments for obtaining information about neighboring network nodes by including a requesting element in a signaling message sent to the neighboring network node. In one embodiment, the signaling message is a connection SETUP message. The response signaling message confirms the connection setup with a CONNECT message. In one refinement, the signaling messages are conveyed in accordance with the ISUP (ISDN User Part) protocol or in accordance with the QSIG protocol. It is thus possible to comply with prescribed standards. The modifications that are to be made for carrying out the method of the embodiment are made in the context of the extension possibilities prescribed by the standards. The core of the ISUP protocol has been defined by the ITU-T (International Telecommunication Union—Telecommunication Sector) in standards Q.761 to Q.765. The core of the QSIG protocol has been defined by the ECMA (European Computer Manufacturer Association) in standards ECMA 143, 165, 173 and 174.

In a further development, an additional identification parameter is requested and communicated without the setup of an additional data transmission connection. Setting up a data transmission connection would tie up additional resources of the data transmission network. Since it is often the case that only a small number of identification parameters have to be transmitted, the transmission in a signaling message is sufficient.

In another development, an additional identification parameter identifies the connection of the transmission link in the partner network node. In one refinement, an additional identification parameter identifies the partner network node. In both cases, the identification takes place at a network maintenance and network management level of the data transmission network.

In another development, an acquisition time duration is prescribed during which steps are executed for the signaling messages, occurring during the acquisition time period, for a plurality of transmission links of the reference network node or repeatedly per transmission link. Information on a plurality of network nodes can be obtained by repeatedly executing the steps for the network nodes that can be reached through a transmission link. The steps can also be employed for network nodes that can be reached through, for example, a multiplexer unit or a virtual private data transmission network.

In one refinement, the internal line numbers received during a predetermined time period are stored with their assignment to the transmission links through which they have been received. Only after the acquisition time period has elapsed are additional identification parameters requested with the aid of the stored identification parameters. This two-stage process makes it possible to more evenly distribute the load on the data transmission network. In another refinement, the steps are repeated periodically. For example, the steps can be executed every five minutes or every ten minutes. Changes in the topology can thus be acquired within the predetermined time period.

In one embodiment, before the start of the predetermined acquisition time period, a record is stored in a data set assigned to the transmission link. Depending on the record, the message element is inserted into the signaling messages. In the absence of the record, on the other hand, the message element is not inserted into the signaling message. The record is erased only at the end of the predetermined time period. The use of a record is an easy way to identify transmission links for which the steps are to be executed and to signal the running of the predetermined time period to other units as well.

In a next development, as soon as the message element is received in the partner network node, a record is stored in a data set assigned to the transmission link. Depending on the record, the identification parameter is inserted into a response signaling message. In the absence of the record, no identification parameters are inserted into response signaling messages. The record is erased upon transmission of a response signaling message containing an identification parameter. This ensures that in the case of a relatively long acquisition time period, fewer response signaling messages containing an identification parameter are transmitted per partner network node. The relatively long acquisition time period is necessary, for example, in order to acquire information on network nodes that can be reached only through a multiplexer unit or through a further data transmission network. Acquisition time periods chosen to be relatively long increase the probability that, during the acquisition time period, a data transmission connection is set up to these network nodes as well, and that the requisite signaling can be used to request an identification parameter.

In a further development, a record is made for at least one transmission link connected to the reference network node. By contrast, a record that the identification parameter is manually prescribed is made for at least one other transmission link connected to the reference network node. A record for a third transmission link is made indicating that a change from a manual prescription to an automatic acquisition of identification parameters is permissible. This development makes it possible to implement specifications in particular for a transition time in which the steps are first introduced.

A further embodiment involves an additional network node that does not lie between the reference network node and the partner network node. The method steps that relate to the partner network node are executed in the additional network node. A reference network node thus determines identification parameters only of neighboring network nodes.

In a next development, a multiplexer unit lies between the reference network node and the partner network node. A multiplexer unit is intended only to fulfill a multiplexer function and, consequently, does not contain the units required for carrying out the method. Moreover, the multiplexer unit contains no units that can execute the method steps relating to the partner network node.

In another development, a transmission link leads to an additional data transmission network, for which a different signaling method for the connection control has been defined than for the data transmission network in which the reference network node is situated. In one refinement, the data transmission network provides the functions of a virtual private network. In such virtual private networks, public switching centers provide the functions of a network node or a data transmission network. Moreover, the virtual private networks have the property of transmitting the signaling messages arriving at the virtual private network unchanged in data structure and data content, i.e., transparently, even when the incoming signaling messages are processed and evaluated in the virtual private network. As an alternative, the additional data transmission network is a backbone network with fixed connections or dial-up connections. In the backbone network, the incoming signaling messages are also transmitted transparently.

Linking the request for the identification parameter to the first signaling message ensures that the identification parameter is communicated only when the transmission link for transmitting the first signaling messages operates properly in both transmission directions. Identification parameters are returned only by those partner network nodes that react to incoming signaling messages for the transmission of data. The failure of a network node can thereby be recognized in a timely manner.

Moreover, it is efficient to request the identification parameter in a message that is being sent in any case, namely to set up the connection to transmit data. Existing node elements are used to communicate the identification parameters. These existing node elements, which are used to transmit and receive signaling messages and to generate and process processing signaling messages, need be modified only slightly in order to transmit, receive, generate and process identification parameters. Thus, the method according to the invention affords a simple and efficient means for the transmission of identification parameters.

Figure 1:
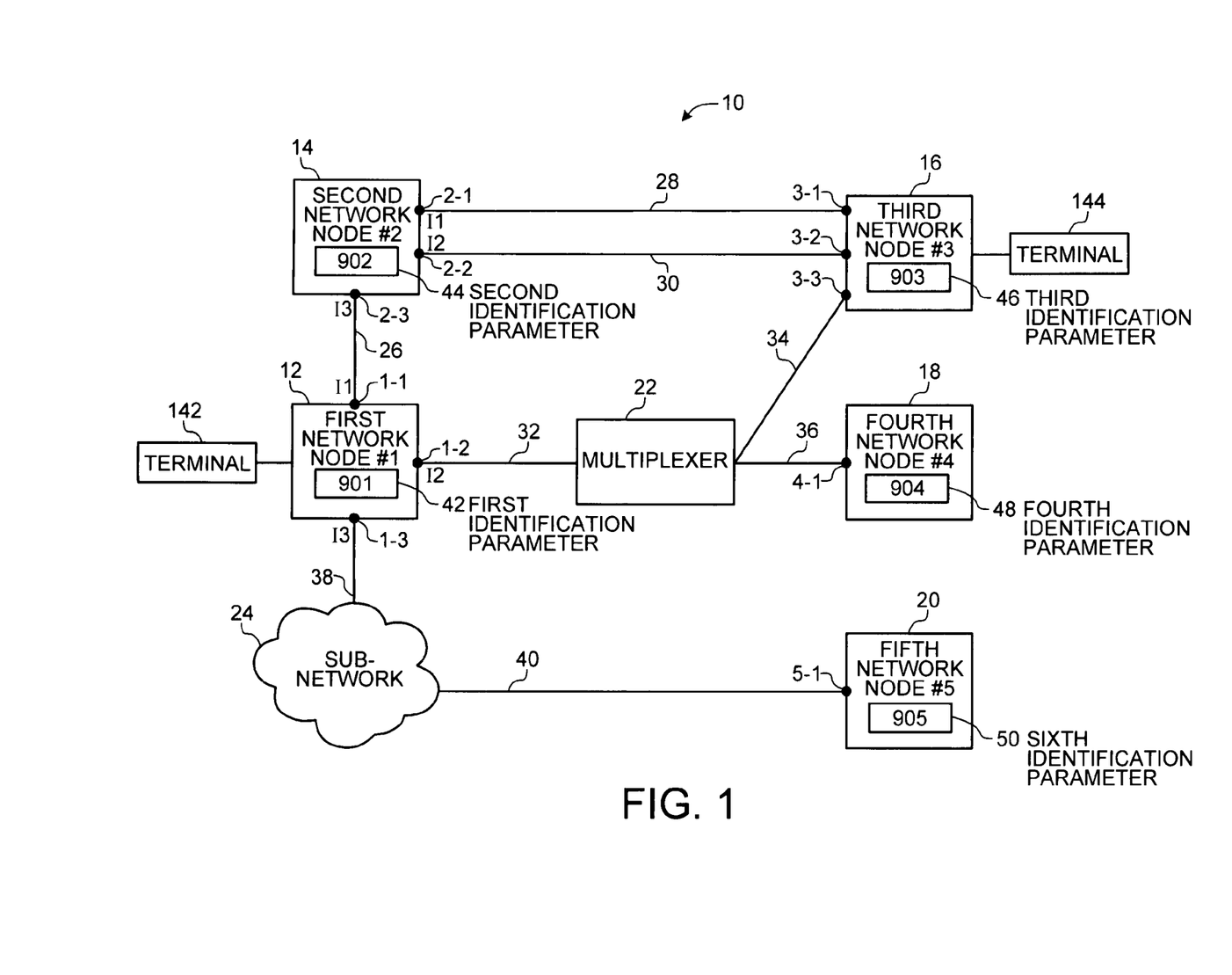
FIG. 1 is a simplified schematic block diagram of a data transmission network with a reference network node.

Reference will now be made in detail to some embodiments of the invention that are illustrated in the accompanying drawings. FIG. 1 is a schematic illustration of a data transmission network 10 with 5 network nodes 12, 14, 16, 18, 20. In a first embodiment, the first network node 12 is also referred to in this discussion as a "reference network node," and the second network node 14 is also referred to as a "partner network node." Data transmission network 10 also contains a multiplexer unit 22 and a sub-network 24 that uses a transparent layer 3 transport protocol.

The first network node 12 and the second network node 14 are connected by a transmission link 26. The second network node 14 and the third network node 16 are connected to one another by two lines 28 and 30, which form two mutually independent transmission links. A line 32 connects the first network node 12 to the multiplexer unit 22. A line 34 connects the multiplexer unit 22 to the third network node 16, and a line 36 connects the multiplexer unit to the fourth network node 18. A line 38 connects the first network node 12 to the sub-network 24. A line 40 connects the sub-network 24 to the fifth network node 20.

The data transmission network 10 can be a private network, for example, the network of a relatively large company. The network nodes 12 through 20 switch data within the private network. In other embodiments, the network nodes need not be in a circuit-switched data transmission network, but rather can be routers in a packet data transmission network.

Transmission channels are present on the lines of the data transmission network 10. The multiplexer unit 22 assigns transmission channels present on the line 32 to transmission channels on the lines 34 and 36 according to either a fixed or an adjustable procedure. In the opposite transmission direction, the multiplexer unit 22 assigns transmission channels present on the lines 34 or 36 to transmission channels on the line 32.

In a first embodiment, the sub-network 24 is a data transmission network in which data is transmitted in accordance with ATM (Asynchronous Transfer Mode). In another embodiment, the sub-network 24 is a data transmission network that functions as a virtual private network. In the virtual private network, the functions of the data transmission network and each network node are provided by one or more public switching centers, for example, the switching centers of the electronically-controlled digital switching system (EWSD) from SIEMENS AG.

In the first embodiment, call identification parameters 42, 44, 46, 48 and 50 having values 901, 902, 903, 904 and 905, are assigned to the network nodes 12, 14, 16, 18 and 20, respectively. The network nodes 12 through 20 can be dialed directly by using the identification parameters 42 through 50. Network node numbers #1, #2, #3, #4 and #5, are assigned to the network nodes 12 through 20, respectively. Network node numbers are used in the management and maintenance of the data transmission network 10. The aforementioned network node numbers are greatly simplified in this example. Actual network node numbers have a plurality of parts that are used to account for hierarchies in the data transmission network 10. For example, in a hypothetical actual network node number 1-1-250, the first, second and third numbers denote the domain, the sub-domain and the network node, respectively.

A line end identification (ID) is defined at the network management level and denotes the connection points of lines 26 through 40 into the network nodes 12 through 20. In this example, the first network node 12 has line end IDs 1-1, 1-2 and 1-3. The second through fifth network nodes 14, 16, 18, 20 have line end IDs 2-1, 2-2, 2-3, 3-1, 3-2, 3-3, 4-1 and 5-1. The line end identifications in this example are also simplified, wherein the first part of the line end identification denotes the network node number. The first part of an actual line end identification generally does not correspond to the network node numbers. Actual line end identifications have four constituent parts. For example, in a hypothetical actual line end identification 1-1-19-1, the first part denotes a switchgear cabinet, the second part denotes a rack in the switchgear cabinet, the third part denotes a slide-in unit in the rack, and the fourth part denotes a circuit set of the slide-in unit.

In the first embodiment, connection points on the first network node 12 for the lines 26, 32 and 38 have line end IDs 1-1, 1-2 and 1-3, respectively. The lines 28, 30 and 26 connect to the second network node 14 at points having line end IDs 2-1, 2-2 and 2-3, respectively. The lines 28, 30, 34 connect to the third network node 16 at points having line end IDs 3-1, 3-2 and 3-3, respectively. The line 36 connects to the fourth network node 18 at a point having a line end ID 4-1. The line 40 connects to the fifth network node 20 at a point having a line end ID 5-1.

Each network node also has internal line numbers that designate the connection lines or the connection points themselves. In this example, the lines 26, 32 and 38 into the first network node 12 are designated by the internal line numbers I1, I2 and I3, respectively. The lines 28, 30, 26 into the second network node 14 are designated by internal line numbers I1, I2 and I3, respectively.

Figure 2:
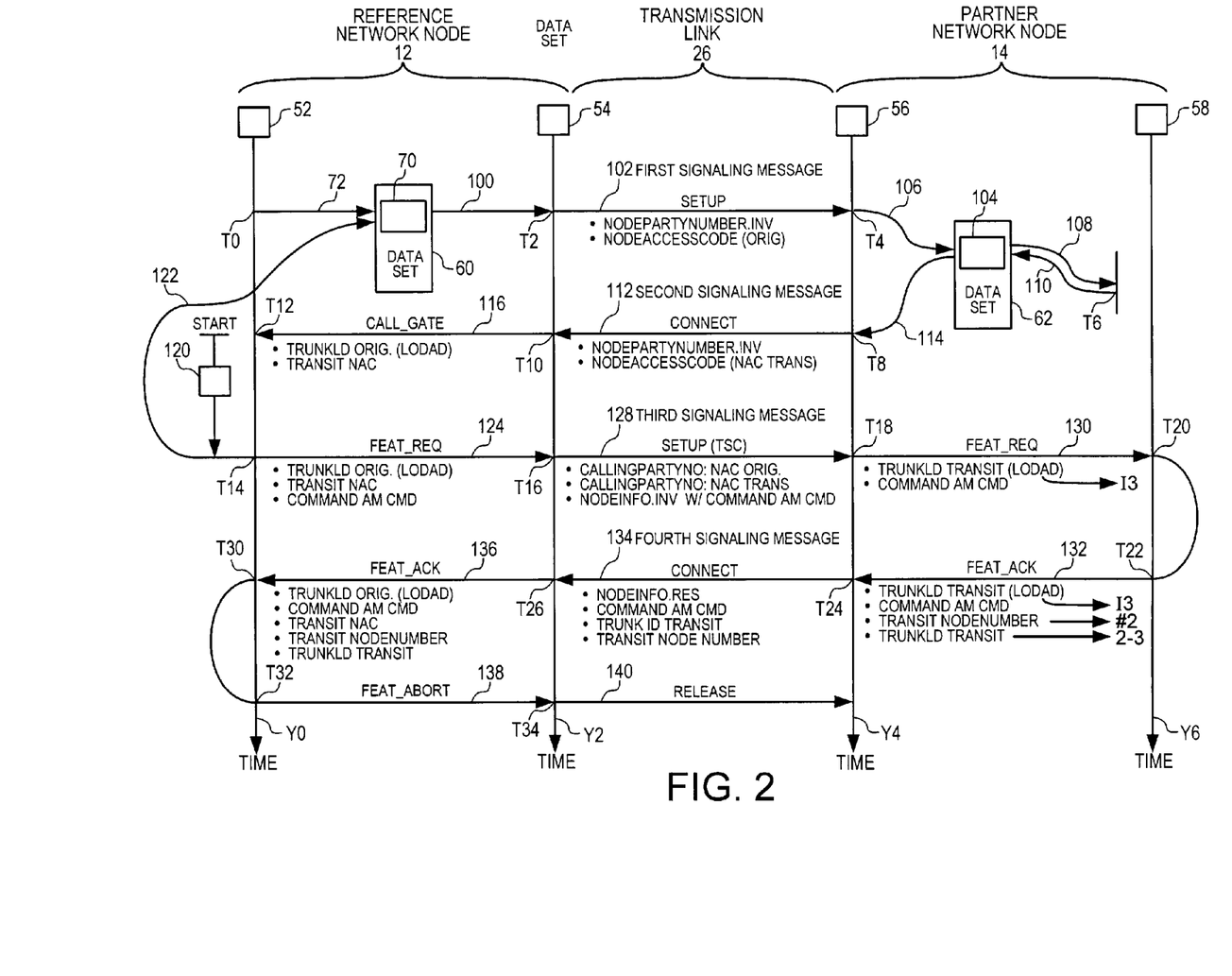
FIG. 2 is a flowchart showing method steps for determining the network node number of a network node neighboring the reference network node.

FIG. 2 illustrates steps originating from the first network node 12 to determine the network node number that has been assigned to the second network node 14. In this first embodiment, the first network node 12 will be referred to as the reference network node, and the second network node 14 will be referred to as the partner network node. FIG. 2 shows a maintenance unit 52 and a connection control unit 54; both are contained in the reference network node 12. The partner network node 14 contains a connection control unit 56 and a maintenance unit 58. Four time lines Y0, Y2, Y4 and Y6 relate to the steps taken in the maintenance unit 52, the connection control unit 54, the connection control unit 56 and the maintenance unit 58. Steps that lie below other steps on lines Y0, Y2, Y4 and Y6 take place later. Steps that lie to the right of other steps also take place later.

In the steps illustrated in FIG. 2, a dynamic line data set 60 is stored in the reference network node 12, and a dynamic line data set 62 is stored in the partner network node 14 are accessed. The dynamic line data sets 60 and 62 contain data relating to the line 26. This data is valid only for short periods of time and, if appropriate, only for individual connections set up over the line 26. In contrast to this, there are also static line data sets that are permanently valid for the line 26. For example, reference network node 12 could have a static line data set for the line 26 (not shown) indicating that the line 26 is to be incorporated in the steps shown in FIG. 2.

Figure 3:
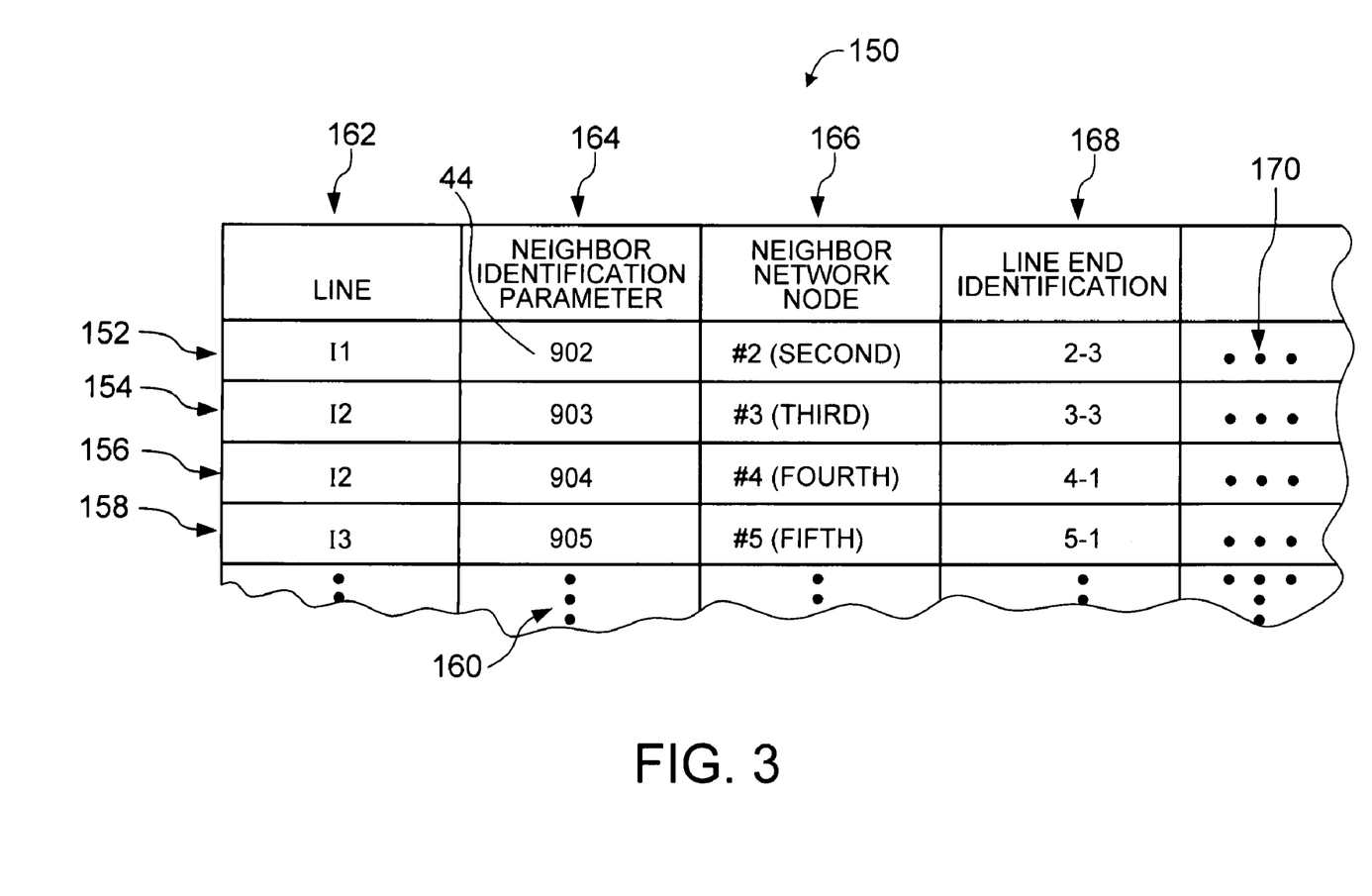
FIG. 3 is a partner table for storing network node numbers once they have been determined.

FIG. 3 is a partner table 150 containing information about each neighboring network node that can act as a partner network node to reference network node 12. For the case where the partner table 150 does not have an entry for the line 26, the maintenance unit 52 uses the static line data set to change the value of a bit position 70 in the dynamic line data set 60 from ZERO to ONE. Setting the value of the bit in the dynamic line data set 60 is represented by arrow 172 and takes place at time T0.

If line 26 is seized (a SEIZURE occurs) to form a connection to a subscriber 144 according to a routing method and the telephone number of subscriber 144, the connection control unit 54 determines that line 26 is to be used for connection setup. The connection control unit 54 checks the value of the bit position 70 of the dynamic line data set 60 for the line 26 (arrow 100). If the bit position has the value ONE, then a first signaling message element NodePartyNumber.inv is inserted into a first signaling message 102 at time T2. The first signaling message 102 is a connection SETUP message. The first signaling message element communicates the first identification parameter 42 of the reference network node 12 to the partner network node 14.

The setup of a call connection between a terminal of a first subscriber 142 connected to the reference network node 12 and a terminal of a second subscriber 144 connected to the network node 16, as shown in FIG. 1, is controlled by the first signaling message 102. Moreover, the first signaling message 102 fulfills the specifications of the QSIG standard for a SETUP message. The first signaling message 102 also contains the telephone number of the subscriber 144 as a destination call number.

The first signaling message 102 is transmitted through the line 26 to the partner network node 14, where it is processed by the connection control unit 56. Based on the first signaling message element NodePartyNumber.inv contained in the first signaling message 102, the connection control unit 56 changes the value of the bit position 104 of the dynamic line data set 62 from ZERO to ONE. Setting the value of the bit in the dynamic line data set 62 is represented by arrow 106 and takes place at time T4.

The dynamic line data set 62 is assigned to the line through which the first signaling message 102 was received in the partner network node 14, i.e., line 26. The connection control unit 56 processes the first signaling message 102 in accordance with the QSIG protocol, so that an additional connection setup message 108 can be transmitted to the network node 16. The additional connection setup message 108 contains no signaling message element NodePartyNumber.inv.

Network node 16 receives an additional signaling message 110, at time T6 confirming that the subscriber 144 has taken his telephone receiver off the hook. The signaling message 110 is a CONNECT message in accordance with the QSIG protocol and contains no signaling message elements over and above the protocol specifications. The incoming signaling message 110 is processed by the connection control unit 56. The value of the bit position 104 is checked because the line 26 is affected. Due to the value ONE in this bit position, a second signaling message element NodePartyNumber.inv is likewise inserted into a second signaling message 112 that is transmitted to the reference network node 12 in accordance with the QSIG protocol. The second signaling message 112 is a CONNECT message.

The second identification parameter 44 of the partner network node 14 is inserted into the second signaling message 112, as shown by arrow 114. After the transmission of the second identification parameter 44, the connection control unit 56 sets the value of the bit position 104 to the value ZERO. The remainder of the second signaling message 112 is constructed in the manner prescribed for a CONNECT message under the QSIG standard.

The second signaling message 112 is transmitted through the line 26 to the reference network node 12, where it is evaluated by the call control unit 54. Based on the second signaling message element NodePartyNumber.inv contained in the second signaling message 112, at time T10, the call control unit 54 generates an internal signaling message 116, which is also referred to as Call_Gate message. The second signaling message 112 is processed by the call control unit 54 in accordance with the QSIG protocol. Among other things, the call control unit 54 initiates the release of transmission channels through which call data will subsequently be transmitted between the subscriber 142 and the subscriber 144.

The internal signaling message 116 is sent to the maintenance unit 52 and contains the following identification parameters: (i) the internal line number I1 for the line 26 on reference network node 12 and (ii) the second identification parameter 44 of the partner network node 14 that was sent with the second signaling message 112.

Upon receipt of the internal signaling message 116 at time T12, the maintenance unit 52 starts a time control unit 120. The time control unit 120 measures a predetermined time period, such as 10 seconds. If seizures, recognized on account of the value ONE of the bit position 70, occur on line 26 in addition to the seizure represented by arrow 100 before the predetermined time period elapses, connection control unit 54 inserts the signaling message element NodePartyNumber.inv into each of the associated connection setup messages.

In this embodiment, only the partner network node 14 can be reached from the reference network node 12 through the line 26. Thus, the second identification parameter 44 identifying partner network node 14 is repeatedly transmitted because the value of the bit position 104 is repeatedly reset during the predetermined time period. No further entries are generated in the partner table 150, however, because there is already an entry for the second identification parameter 44.

The steps of the embodiment are also carried out for the line 32 in FIG. 2. Within the predetermined time period, for each signaling message received by the network node 16, the bit position corresponding to the bit position 104 is set in the network node 16 and reset when a connection message is transmitted. Moreover, the same steps as those carried out in the network node 16 are executed in the other network node 18 that can also be reached through the line 32. Thus, signaling messages can also arrive from the network node 18 containing the identification parameter 904 of the network node 18. Identification parameter 904 is shown in FIG. 3.

After the predetermined time period measured by the time control unit 120 has elapsed, the maintenance unit 52 sets the bit position 70 to the value ZERO, as represented by arrow 122. The start of the predetermined time period measured by the time control unit 120 is defined by the first internal signaling message 116, which arrives only after the setting of the record in the bit position 70. If additional internal signaling messages are received before the predetermined time period has elapsed, this has no influence on the length of the predetermined time period. Internal signaling messages arriving during the predetermined time period are processed by the maintenance unit 52. Identification parameters for additional internal signaling messages are stored in the partner table 150, shown in FIG. 3.

After the predetermined time period has elapsed, entries in the partner table 150 that relate to the line 26, i.e., to the internal line number I1, are established. The maintenance unit 52 generates a request message 124 containing the following identification parameters: (i) the internal line number I1, (ii) the second identification parameter 44, and (iii) a command AM CMD, with which further identification parameters are requested.

The request message 124 is directed to the connection control unit 54. At time T16, the connection control unit 54 processes the request message 124 and generates a third signaling message 128. The third signaling message is a pseudo-connection SETUP message that is constructed like a connection setup message conforming to the QSIG protocol, but does not function to set up a connection of a data transmission between subscribers. The third signaling message 128 comprises the following identification parameters: (i) the first identification parameter 42, which is the originating call number, (ii) the second identification parameter 44, which is the destination call number, and (iii) an information field NodeInfo.inv containing the command AM CMD.

The connection control unit 54 need not determine any routing after receiving the request message 124 because that message contains the internal line number I1. The line that is to be used for forwarding, namely line 26, can be determined directly from the internal line number I1.

The third signaling message 128 is transmitted through the line 26 to the partner network node 14, where it is processed by the connection control unit 56. The connection control unit 56 determines the internal line number I3 with respect to the line 26 on which the third signaling message 128 arrives. Based on the identification parameters contained in the third signaling message 128, the connection control unit 56 initiates the generation of a request message 130 to the maintenance unit 58. The request message 130 is also referred to as FEAT_REQ message and contains the following identification parameters: (i) the internal line number I3, and (ii) the command AM CMD.

The maintenance unit 58 receives the request message 130 at time T20 and generates a response message 132, which is transmitted to the connection control unit 56 at time T22. The response message 132 is also referred to as FEAT_ACK message. During the processing of the request message 130, the maintenance unit 58 determines the following identification parameters: (i) the network node number (#2) of the partner network node 14 in which the maintenance unit 58 is situated, and (ii) the line end ID 2-3 associated with the internal line number I3 of the line 26 in the partner network node 14. The response message 132 contains the following identification parameters: (i) the internal line number I3, (ii) the command AM CMD, (iii) the network node number (#2), and (iv) the line end ID 2-3.

At time T24, in response to the message 132, the connection control unit 56 generates a fourth signaling message 134. The fourth signaling message 134 is a pseudo-connection message that fulfills the specifications of the QSIG protocol for a CONNECT message, but is not related to the transmission of subscriber data. In addition to the data fields prescribed in the QSIG protocol, the fourth signaling message 134 contains a fourth signaling message element NodeInfo.res. The fourth signaling message element contains the information included in the message 132, except for the internal line number I1. The fourth signaling message 134 also contains the identification parameter of the partner network node 14. The fourth signaling message 134 is transmitted through the line 26 to the reference network node 12, where it is processed by the connection control unit 54. At time T26, the connection control unit 54 generates a response message 136 responding to the fourth signaling message 134.

The response message 136 contains the internal line number I1 of the line 26 and also the second identification parameter 44 of the partner network node 14. The response message 136 also contains the information in the fourth signaling message element NodeInfo.res. At time T30, the response message 136 is received and evaluated by the maintenance unit 52. During the evaluation, the maintenance unit 52 enters into the partner table 150 the network node number (#2) of the partner network node 14 and the line end ID associated with the line 26 with the internal line number I1.

At time T32, the maintenance unit 52 generates an abort message 138, which is also referred to as FEAT_ABORT message. The abort message 138 is sent to the connection control unit 54, where a release message 140 is transmitted at time T34. Release message 140 conforms to the requirements of a RELEASE message according to the QSIG protocol and configures the system resources requested by the third signaling message 128 and the fourth signaling message 134.

FIG. 3 shows the partner table 150. The partner table 150 has rows 152, 154, 156 and 158 relating to the lines connected to the reference network node 12. Additional rows 160 are indicated by dots. Relating to each connected line, columns 162, 164, 166 and 168 contain, respectively, the internal line number of the reference network node 12, the identification parameter of the network node to which the line leads, the network node number of the neighboring network node and the line end ID of the relevant line in the neighboring network node. Additional columns 170 are indicated by dots. For the example of the steps shown in FIG. 2, the row 152 contains the following values relating to the line 26: (i) internal line number [I1], (ii) the second identification parameter 44 [902] of the neighboring (partner) network node 14, (iii) the network node number [#2] of the neighboring network node 14, and (iv) the line end ID [2-3] in the neighboring network node 14.

When the steps shown in FIG. 2 are executed for the line 32, then entries in the rows 154 and 156 arise. For the line 38, the entries appear in the row 158.

In another embodiment, the line end IDs of the lines designated by the internal line numbers I1, I2 and I3 are recorded with respect to the reference network node 12 instead of with respect to the neighboring network nodes. For example, the line end ID 1-1 is recorded for the line 26 with the line identification I1.

Figure 4A:
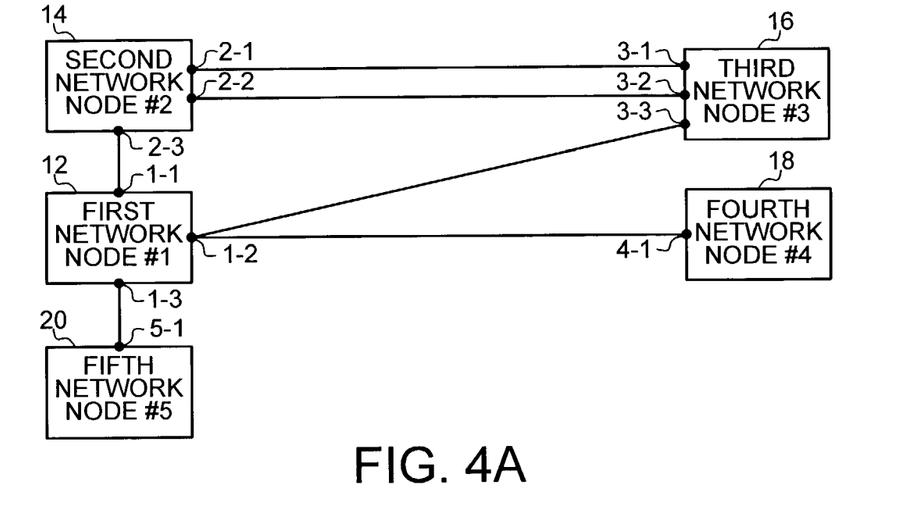
FIGS. 4A, 4B and 4C are block diagrams showing network topologies based on partner tables before a network disturbance, during a network disturbance and after executing a transition measure to eliminate the disturbance.
Figure 4B:
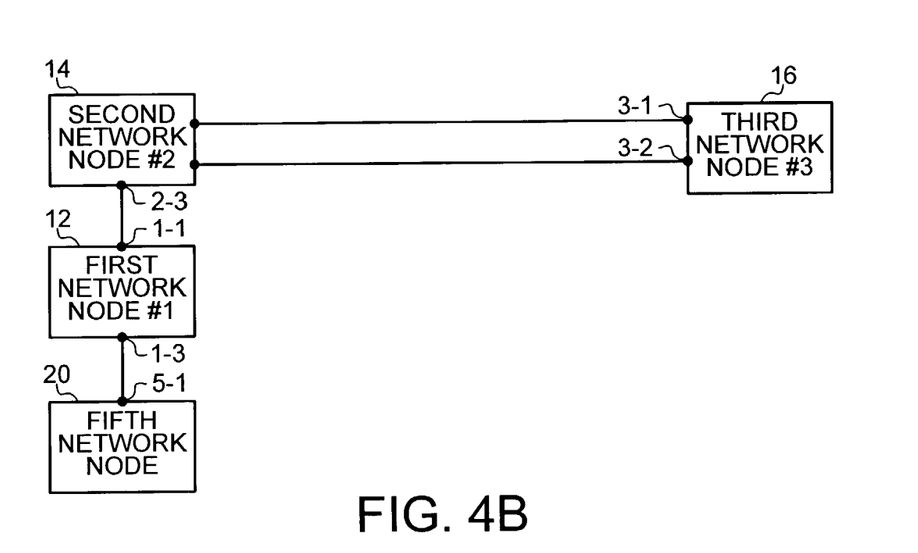
Figure 4C:
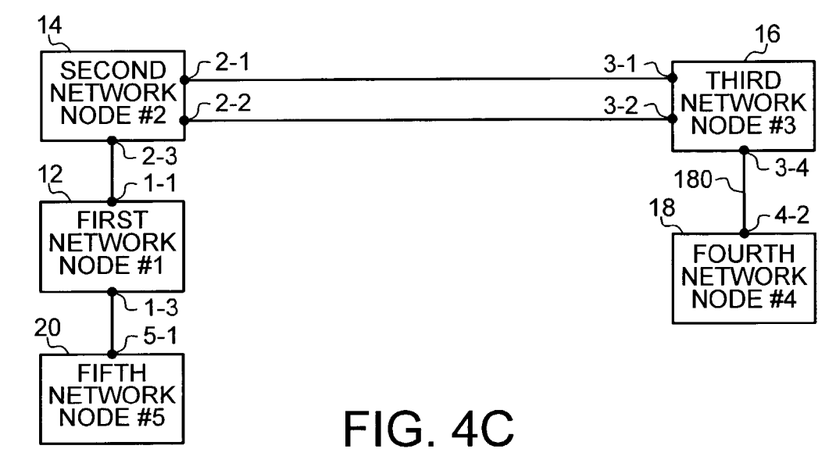

FIG. 4A shows a possible network topology for the data transmission network 10 before a network disturbance. FIG. 4B shows a topology during the network disturbance, and FIG. 4C shows a topology after a transition measure has been implemented before the final elimination of the network disturbance. The steps shown in FIG. 2 are carried out not only for the reference network node 12, but also for the other network nodes 14, 16, 18 and 20 of the data transmission network 10. The partner tables 150 that are generated through the steps shown in FIG. 2 are communicated to a central computer unit, where they are evaluated to form a graphical representation of the network topology, such as that shown in FIG. 4A. The network nodes are designated by their network node numbers, #1 through #5. The line connections are designated by the line end IDs 1-1 through 5-1. The multiplexer unit 22 and the sub-network 24 are not shown because the steps shown in FIG. 2 are not affected by them.

The steps of the first embodiment are executed each time a reference network node 12, 14, 16, 18, 20 is activated, so that all the network nodes are taken into account during the acquisition of the network topology. The steps are executed at regular intervals in each network node, and both synchronous execution and asynchronous execution is possible. Periodic execution of the steps, called "polling," also allows disturbances and the deactivation of network nodes to be detected.

A substep corresponding to the step executed at time T14 is repeatedly executed. For entries already contained in the partner table 150 and for which the line end ID and the internal line number have already been entered, a record is no longer set in the bit position 70 or in a bit position corresponding to the bit position 70. In this substep, neither signaling messages for the setup of a data transmission nor subscriber data need be transmitted. By repeatedly executing the substep, it is possible to erase entries in the partner table 150 if a partner network node fails. It is advantageous to wait for the absence of a plurality of connection messages 134.

Let us assumed that the network disturbance is the failure of the multiplexer unit 22. After the steps of the first embodiment have been carried out in all the network nodes and the updated partner tables for each node have been communicated to the central computer unit, the central computer unit generates the illustration of the network topology shown in FIG. 4B, for example, on a display monitor. The two transmission links 34 and 36 of FIG. 1 leading from the reference network node 12 (having a network node number #1) to the network node 16 (having a network node number #3) and to the network node 18 (having a network node number #4) are no longer represented in FIG. 4B. In response to an alteration of the network topology, the central computer automatically generates an error message indicating a disturbance. In order to eliminate the disturbance, a new connection between the network node 16 and the network node 18 is creating through switching for a transition period.

When the steps in FIG. 2 are executed again in all the network nodes 12 through 20 after the creation of the new transmission link through switching, the central computer evaluates the updated partner tables and produces the network topology shown in FIG. 4C. A transmission link 180 now lies directly between the network nodes 16 and 18, i.e., between the network nodes having network node numbers #3 and #4. The transmission link 180 is assigned the line end ID 3-4 on the network node 16 and the line end ID 4-2 on the network node 18.

Figure 5:
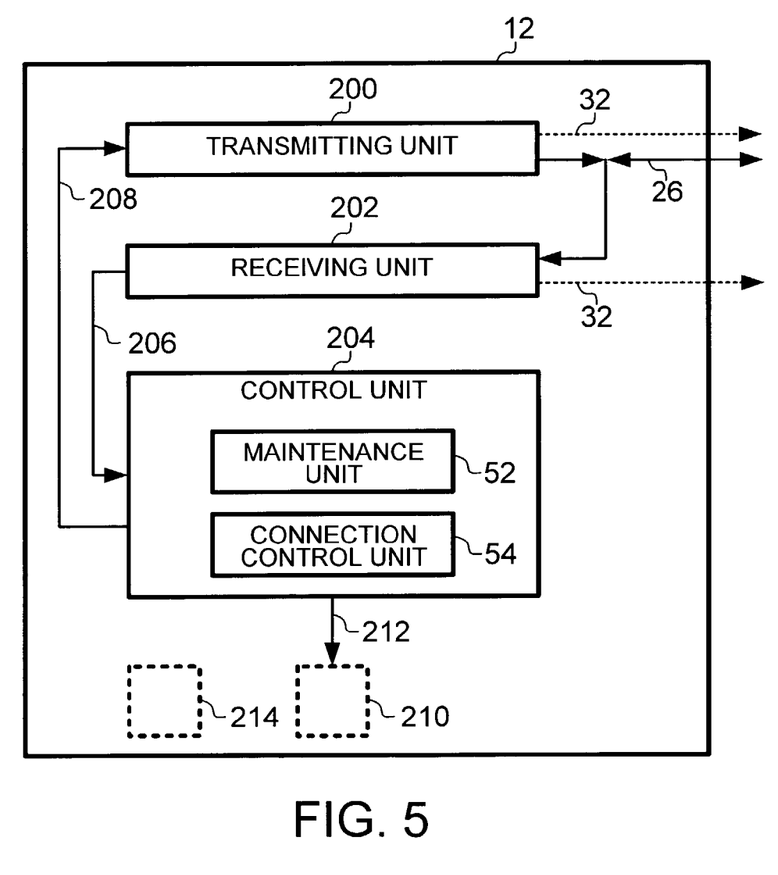
FIG. 5 is a simplified schematic block diagram of a reference network node.

FIG. 5 shows the construction of the reference network node 12 with regard to the units involved in carrying out the steps in FIG. 2. The reference network node 12 contains a transmitting unit 200, a receiving unit 202 and a control unit 204. The transmitting unit 200 is used to transmit the signaling messages that are generated in the reference network node 12. The transmitting unit 200 transmits signaling messages through the line 26 and the other lines connected to the reference network node 12, for example, the lines 32 and 38.

The receiving unit 202 is used to receive the signaling messages sent to the reference network node 12 on the lines 26, 32 and 38 connected to the reference network node 12. The arriving signaling messages are forwarded (as shown by arrow 206) to the control unit 204 by the receiving unit 202.

The control unit 204 evaluates the received signaling messages in accordance with the QSIG protocol and controls (as shown by arrow 208) the transmitting unit 200 in such a way that protocol-conforming response messages are generated. The control unit 204 contains the maintenance unit 52 and the connection control unit 54. The control unit 204 stores (as shown by arrow 212) the partner table 150 in a storage unit 210.

In the first embodiment, the functions of the transmitting unit 200, the receiving unit 202 and the control unit 204 are provided by non-programmable circuits. In another embodiment, the functions of the transmitting unit 200, the receiving unit 202 and the control unit 204 are provided by circuits that can execute programs with the aid of a processor 214.

The steps explained with reference to FIG. 2 can be executed independently of whether the partner network node 18 is a transit network node or a terminating network node, i.e., a network node to which the called subscriber is connected. The reference network node may be a transit network node or an originating network node, i.e., a network node to which the calling subscriber is connected. Moreover, it is not necessary for the second signaling message 112 to be generated as a result of the first signaling message 102. It is sufficient that the connection message 102 is transmitted on a line 26 for which the bit position 104 or a bit position corresponding to the bit position 104 has the value ONE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) inserting a first signaling message element into a first signaling message, the inserting being performed by a first network node;
   (b) receiving the first signaling message and the first signaling message element onto a second network node from the first network node, the first signaling message being received via a transmission link that connects the second network node with the first network node, the first signaling message element requesting the transmission of a first identification parameter that identifies the second network node;
   (c) using the first signaling message to control a connection setup of a data transmission between a first terminal and a second terminal, the first terminal and the second terminal and the first network node and the second network node being parts of a first data transmission network;
   (d) transmitting a second signaling message from the second network node back through the transmission link to the first network node, the second signaling message containing the first identification parameter, wherein the first identification parameter is an internal line number that is used to request identification parameters from the second network node;
   (e) generating a third signaling message using the internal line number, the generating being performed by the first network node;
   (f) receiving the third signaling message and a third signaling message element onto the second network node from the first network node, the third signaling message element requesting the transmission of a second identification parameter that identifies the second network node; and
   (g) transmitting a fourth signaling message from the second network node back through the transmission link to the first network node, the fourth signaling message containing the second identification parameter.

2. The method of claim 1, wherein the third signaling message is a pseudo-connection SETUP message.

3. The method of claim 1, wherein the third signaling message that requests the second identification parameter, and the fourth signaling message that responds with the second identification parameter are transmitted without an additional connection SETUP of an additional data transmission.

4. The method of claim 1, further comprising:
   (h) the second network node receiving a fourth signaling message element from the first network node, the fourth signaling message element requesting the transmission of a third identification parameter that identifies a line connection on the second network node for the transmission link;
   (i) the second network node providing the second identification parameter and the third identification parameter, the second identification parameter and the third identification parameter being used for the maintenance of the first data transmission network; and
   (j) the second network node transmitting a fifth signaling message back through the transmission link to the first network node, the fifth signaling message containing the second identification parameter and the third identification parameter.

5. The method of claim 1, further comprising:
   (h) setting an acquisition time duration;
   (i) executing the method based on signaling messages received during the acquisition time duration, the signaling messages containing identification parameters assigned to a plurality of transmission links connecting to the first network node;
   (j) storing each identification parameter received during the acquisition time duration according to the assigned transmission link of the identification parameter; and
   (k) requesting additional identification parameters after the acquisition time duration has elapsed using the stored identification parameters.

6. The method of claim 5, wherein, before the acquisition time duration starts, a record in the first network node is stored in a data set assigned to the transmission link,
   wherein, depending on the record, the first signaling message element is inserted into the first signaling message,
   wherein, in the absence of the record, the first signaling message element is not inserted into the first signaling message,
   wherein, the second signaling message defines the start of the acquisition time duration, and
   wherein the record is removed after the acquisition time duration has elapsed.

7. The method of claim 5, wherein, if the first signaling message element is received, a record in the second network node is stored in a data set assigned to the transmission link,
   wherein, depending on the record, the first identification parameter is inserted into the second signaling message,
   wherein, in the absence of the record, the first identification parameter is not inserted into the second signaling message, and
   wherein the record is removed upon the transmission of the second signaling message with the first identification parameter.

8. The method of claim 6, wherein the record requires the first identification parameter to be set manually for at least one transmission link connected to the first network node, and
   wherein the record allows a change from a manual prescription to an automatic acquisition of the first identification parameter for at least one transmission link connected to the first network node.

9. The method of claim 1, wherein a record in an additional network node is stored in a data set assigned to the transmission link when the first signaling message element is received, wherein, depending on the record, the first identification parameter is inserted into the second signaling message, wherein, in the absence of the record, the first identification parameter is not inserted into the second signaling message, wherein the record is removed upon the transmission of the second signaling message with the first identification parameter, and wherein the additional network node is not connected to both the first network node and the second network node.

10. The method of claim 1, where a multiplexer unit is connected to both the first network node and the second network node, the multiplexer unit using a time division multiplexer mode to provide a multiplexer function and a multiplexer function for the transmission link and at least two additional transmission links connected to the multiplexer unit.

11. The method of claim 1, wherein the transmission link leads to a second data transmission network, the second data transmission network using a signaling method that differs from the signaling method used by the first data transmission network to control the connection SETUP,
   wherein the internal line number contained in the second signaling message and the second identification parameter contained in the fourth signaling message remain unchanged as the second signaling message and the fourth signaling message are transmitted through the second data transmission network, and
wherein the second data transmission network provides the function of a virtual private network.

12. The method of claim 1, wherein before the second signaling message has been received, a check is made periodically to determine whether the second network node is still reachable through the transmission link.

* * * * *